(12) United States Patent
Geiger et al.

(10) Patent No.: US 11,142,381 B1
(45) Date of Patent: Oct. 12, 2021

(54) SADDLE THAT ADJUSTS TO A BUNDLE DIAMETER

(71) Applicant: HellermannTyton Corporation, Milwaukee, WI (US)

(72) Inventors: Gerard G. Geiger, Jackson, WI (US); Reese L. Vaughn, Denver, CO (US)

(73) Assignee: Hellermann Tyton Corporation, Milwaukee, WI (US)

( * ) Notice: Subject to any disclaimer, the term of this patent is extended or adjusted under 35 U.S.C. 154(b) by 0 days.

(21) Appl. No.: 16/940,262

(22) Filed: Jul. 27, 2020

(51) Int. Cl.
 *B65D 63/10* (2006.01)
(52) U.S. Cl.
 CPC ............................... *B65D 63/1072* (2013.01)
(58) Field of Classification Search
 CPC .......... B65D 2563/108; B65D 63/1072; B65D 63/1027; F16L 3/137; F16L 3/233; F16L 3/237; F16B 5/123
 See application file for complete search history.

(56) References Cited

U.S. PATENT DOCUMENTS

| | | | | |
|---|---|---|---|---|
| 3,632,071 | A * | 1/1972 | Cameron | F16L 3/10 248/74.3 |
| 5,368,261 | A * | 11/1994 | Caveney | F16L 3/233 248/73 |
| 7,503,528 | B2 * | 3/2009 | Adams | F16B 5/0685 24/297 |
| 8,028,962 | B2 | 10/2011 | Geiger | |
| 8,601,649 | B2 * | 12/2013 | Klein | F16B 21/084 24/457 |
| 9,899,822 | B2 * | 2/2018 | Richardson | F16B 21/088 |
| 2002/0071715 | A1 * | 6/2002 | Geiger | H02G 11/00 403/119 |
| 2003/0222184 | A1 * | 12/2003 | Geiger | F16L 3/137 248/65 |
| 2004/0076465 | A1 * | 4/2004 | Geiger | F16B 5/0685 403/278 |
| 2005/0242247 | A1 * | 11/2005 | Geiger | F16L 3/2332 248/74.3 |
| 2007/0102594 | A1 * | 5/2007 | Geiger | H02G 3/32 248/71 |
| 2011/0068234 | A1 * | 3/2011 | Schaety | F16L 3/233 248/68.1 |
| 2012/0217355 | A1 * | 8/2012 | Geiger | F16L 3/2332 248/74.2 |

(Continued)

*Primary Examiner* — David M Upchurch
(74) *Attorney, Agent, or Firm* — Colby Nipper PLLC

(57) ABSTRACT

This document describes a saddle that adjusts to a bundle diameter. In some aspects, the saddle is a component of a cable-tie mounting assembly and forms a curved or planar mounting surface, which is flexible to support a bundle. The saddle includes an aperture for receiving a cable tie. The saddle also includes two laterally-extending distal flexible tabs that are flexible to conform to a bundle diameter based on a force applied by the cable tie disposed within the aperture and tensioned around the bundle to secure the bundle to the mounting surface of the saddle. The flexibility of the saddle surface to adjust into mating contact with the bundle (i) significantly reduces gaps created between the bundle, the cable tie, and the distal flexible tabs and (ii) provides side support, preventing rotation and lateral movement of the secured bundle and reducing the likelihood of damage to the bundle.

20 Claims, 7 Drawing Sheets

(56) References Cited

U.S. PATENT DOCUMENTS

| | | | |
|---|---|---|---|
| 2013/0119208 A1* | 5/2013 | Geiger | F16B 21/088 248/68.1 |
| 2016/0223100 A1* | 8/2016 | Geiger | F16L 3/2332 |
| 2017/0122459 A1* | 5/2017 | Haynes | F16L 3/18 |
| 2018/0231044 A1* | 8/2018 | Bejin | F16B 21/16 |
| 2020/0102979 A1* | 4/2020 | Bejin | F16L 3/137 |

* cited by examiner

SADDLE THAT ADJUSTS TO A BUNDLE DIAMETER

BACKGROUND

Cable ties have a long history of use for securing bundles of objects (e.g., wire-bundles). Some cable-tie mounting assemblies include amount to secure objects of a bundle to a supporting structure, such as a beam. However, when securing a bundle to a mount instead of directly to the supporting structure, conventional cable-tie mounting assemblies create gaps on opposing-lateral sides of the bundle, between the bundle, the mount, and the cable tie. These gaps allow the secured bundle and objects within the secured bundle to migrate, move, and turn in a loosely-looped bundle. This movement can cause chafing on the bundle surface when subject to vibrations. In extreme vibration applications, the chafing can be more severe. For example, if the bundle is a wire-bundle, the chafing can wear into wire insulation of the wire-bundle and expose bare copper, requiring repair or replacement.

SUMMARY

This document describes a saddle that adjusts to a bundle diameter. In some aspects, the saddle is a component of a cable-tie mounting assembly. The saddle (also referred to herein as a "saddle mount") forms a planar or curved mounting surface, which is flexible to support a bundle of wires, cables, or other elongate objects. The saddle mount includes an aperture for receiving a cable tie. The saddle mount also includes two laterally-extending distal flexible tabs that are flexible to conform to a bundle diameter based on a force applied by a cable tie disposed within the aperture and tensioned around the bundle to secure the bundle to the mounting surface of the saddle mount. The flexibility of the distal flexible tabs significantly reduces gaps created between the bundle, the cable tie, and the distal flexible tabs. The flexibility of the saddle surface to adjust into mating contact with the bundle also provides side support, preventing lateral migration or movement of the secured bundle. Conforming saddle surfaces secured to bundles of wires are less likely to chafe wires when subject to vibrations.

In other aspects, a saddle mount that adjusts to a bundle diameter is described. The saddle mount includes a mounting section that is attachable to a supporting structure to secure the saddle mount to the supporting structure. The saddle mount also includes a saddle section. The saddle section defines a mounting surface and an aperture for receiving a cable tie configured to wrap around and secure a bundle to the mounting surface. The saddle section has a base portion connected to the mounting section, where the mounting section extends from a surface of the base portion of the saddle section that is opposite the mounting surface. Additionally, the saddle section has a mounting portion, which includes a bridge section connecting two laterally spaced and substantially parallel support rails to support the mounting surface of the saddle section for abutting the bundle. The mounting portion also includes first and second distal flexible tabs, which laterally extend from opposing lengthwise sides of the bridge section, are aligned with the support rails, and have a thickness tapered from a proximal end connected to the bridge section to a distal end. In addition, the first and second distal flexible tabs are configured to flex to conform to the diameter of the bundle based on an upward force applied by the cable tie when the cable tie is disposed within the aperture and tensioned around the bundle abutting the mounting surface.

In yet other aspects, a saddle mount that adjusts to a bundle diameter is disclosed. The saddle mount includes a first portion and a second portion. The first portion has a mounting surface for supporting a bundle. In addition, the first portion has an H-shaped frame comprising a bridge section orthogonally connected at opposing ends to a pair of rails, which are substantially parallel to one another. The saddle section also includes two distal flexible tabs aligned with, and disposed between, the pair of rails. Each distal flexible tab is integrally connected to a lengthwise side of the bridge section to form a flush contour of the mounting surface at a location where the distal flexible tab has a first thickness that is less than a second thickness of the bridge section. In addition, each distal flexible tab is tapered from a proximal end connected to the bridge section to a distal end. Also, each distal flexible tab is configured to flex based on an upward force to conform to the diameter of the bundle abutting the mounting surface. The second portion is connected to the first portion opposite the mounting surface to define an aperture for receiving a cable tie configured to wrap around and secure the bundle to the mounting surface. Also, the second portion is connectable to a mounting section that is attachable to a supporting structure to secure the saddle mount to the supporting structure.

This summary is provided to introduce simplified concepts for a saddle mount, which are further described below in the Detailed Description and Drawings. This summary is not intended to identify essential features of the claimed subject matter, nor is it intended for use in determining the scope of the claimed subject matter.

BRIEF DESCRIPTION OF THE DRAWINGS

The details of one or more aspects of a saddle mount for a cable-tie mounting assembly are described in this document with reference to the following drawings. The same numbers are used throughout the drawings to reference like features and components.

DETAILED DESCRIPTION

Conventional mounts used in cable-tie mounting assemblies create gaps on either side of the bundle, between the mount and the cable tie. The gaps enable the bundle to laterally shift or rotate, which can chafe and damage the bundle surface when subject to vibrations.

Details of one or more aspects of a saddle mount for a cable-tie mounting assembly are described below. The saddle mount can be used together with a cable tie to form a cable-tie mounting assembly configured to secure a bundle to a supporting structure. The term "bundle" used herein refers to any object or objects that may be secured to a mounting structure via a saddle mount. Common examples of a bundle, which is securable via an example saddle mount, include a wire-bundle or a bundle of cables, lines, hoses, tubing, conduit, or other objects (e.g., elongate objects) that need securing.

The saddle mount includes a structure that allows distal flexible tabs of the saddle to flex toward the bundle, forming a cradle that conforms to the bundle. In particular, the saddle mount includes an H-shaped frame to support the bundle on the top surface of the saddle mount. The H-shaped frame includes a bridge section connected at opposing ends to a pair of support rails, which may be planar or curved upward to form a mounting surface. Between the support rails are distal flexible tabs cantilevered to opposing lengthwise sides of the bridge section. The distal flexible tabs are aligned with the plane or curvature of the support rails. Further, the distal flexible tabs are tapered away from the bridge section to allow flexibility. In one example, the distal flexible tabs are separate from each of the support rails (e.g., separated by a space). In another example, the distal flexible tabs are connected to the support rails by a connecting member that is malleable (e.g., plastically deformable) to enable the distal flexible tabs to flex.

The flexibility of the distal flexible tabs allows the cable-tie mounting assembly to reduce the size of, or substantially eliminate, the gaps. In addition, the distal flexible tabs adjusting into mating contact with the bundle provides side support to prevent lateral migration or movement of the secured bundle. Conforming saddle surfaces secured to bundles of wires are less likely to chafe wires when subject to vibrations.

The saddle described herein is not limited to the push mount embodiments described herein, but can also be adapted or applied to any suitable type of mount, some examples of which include an arrowhead mount, an adhesive mount, a masonry mount, an edge clip mount, a screw mount, a stud mount, a swivel mount, and so forth. Further, the mounting surface of the saddle is not limited to a curved surface, but may be a planar surface, a V-shaped surface, a surface with an exaggerated curve, or any other suitable type of surface suitable for mounting a bundle thereon.

Example Environment

Figure 1:
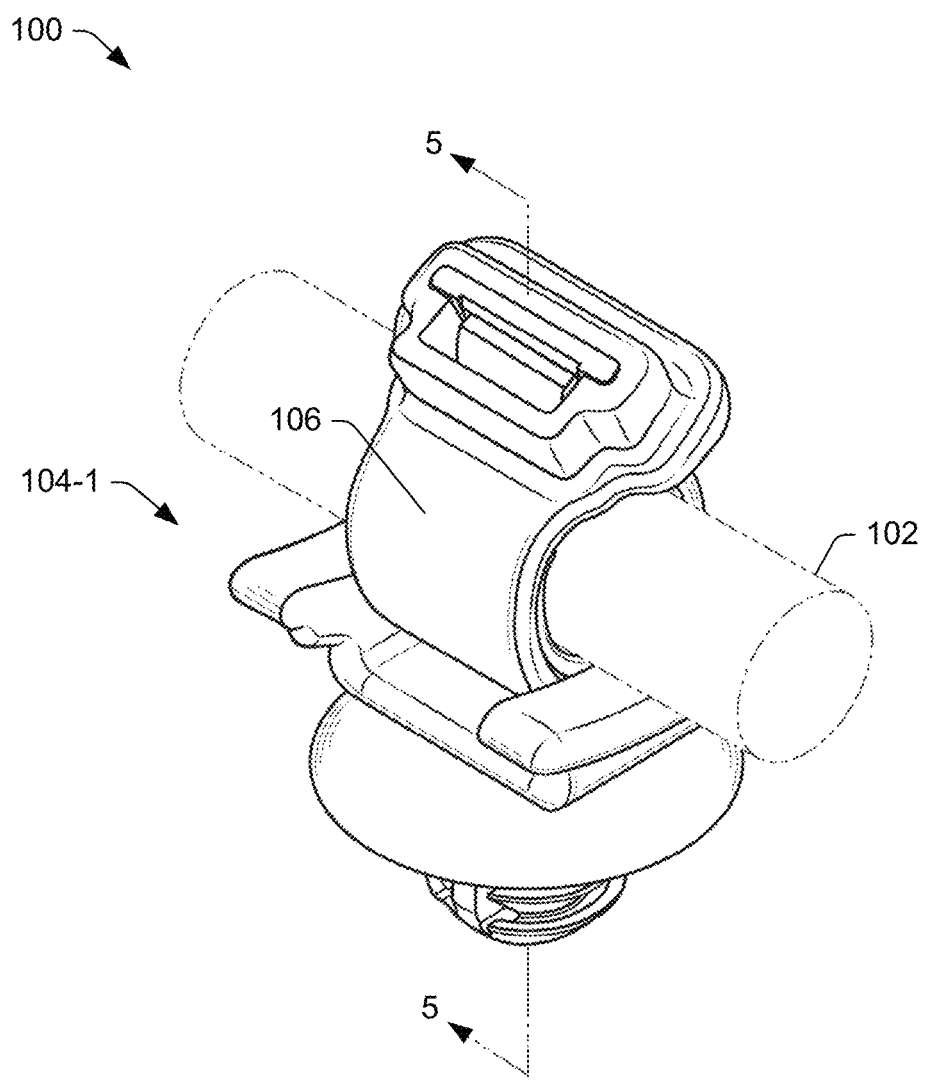
FIG. 1 illustrates an isometric view of an example implementation of a cable-tie mounting assembly securing a bundle.

FIG. 1 illustrates an isometric view of an example implementation of a cable-tie mounting assembly 100 securing a bundle 102. The cable-tie mounting assembly 100 includes a saddle mount 104-1 and a cable tie 106. As is described in further detail below, the cable tie 106 is inserted through the saddle mount 104-1 and wrapped around the bundle 102 to secure the bundle 102 to a mounting surface of the saddle mount 104-1, and the saddle mount 104-1 may be secured to a support structure (not shown), such as a wall, beam, or other rigid structure. The bundle 102 may include any suitable individual object or plurality of objects, such as wires, cables, hoses, tubing, or other elongate articles. In aspects, the bundle 102 may include a bundle of individual wires or cables, rigid or flexible conduit, hoses, or hot or cold fluid transporting tubes. The bundle 102 may also include a conventional tubular conduit.

Figure 2:
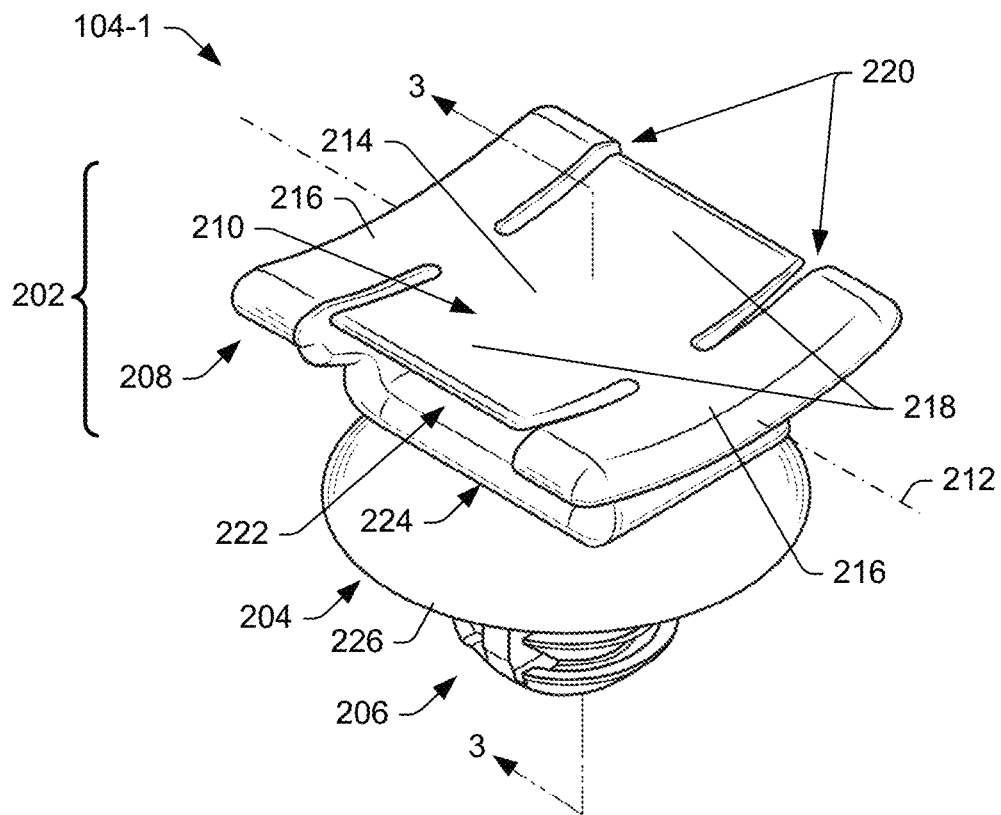
FIG. 2 illustrates an isometric view of example implementation of a saddle mount of the cable-tie mounting assembly from FIG. 1.
Figure 3:
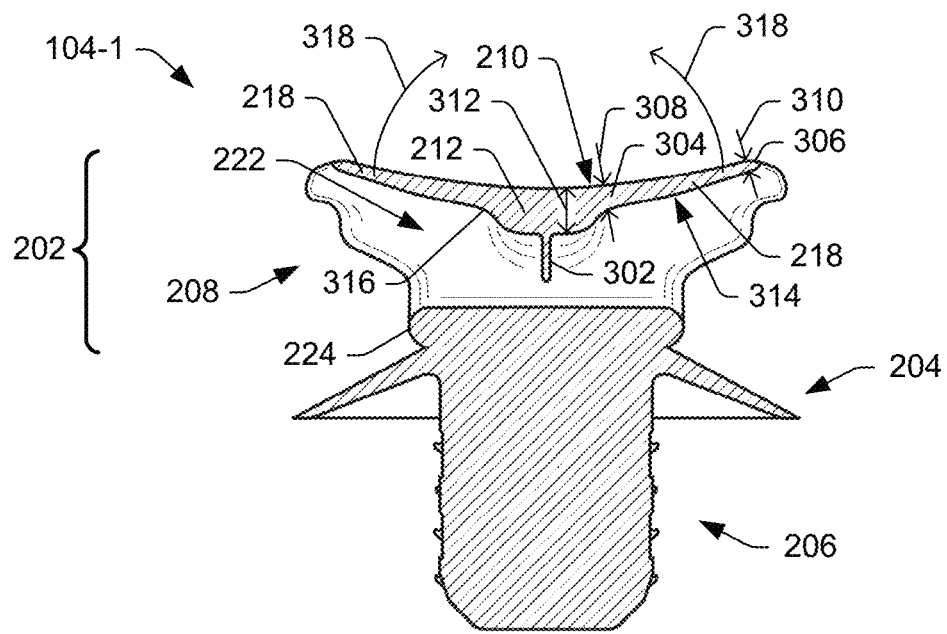
FIG. 3 illustrates a front sectional view of the saddle mount from FIG. 1, taken along section line 3-3.

FIG. 2 illustrates an isometric view of an example implementation of the saddle mount 104-1 of the cable-tie mounting assembly 100 from FIG. 1. Additionally, FIG. 3 illustrates a front sectional view of the saddle mount 104-1 from FIG. 2, taken along section line 3-3.

The saddle mount 104-1 includes a saddle section 202, a spring section 204, and a mounting section 206. The saddle section 202 includes a top portion 208 (also referred to herein as a mounting portion) having a mounting surface 210 that is upwardly curved about a longitudinal axis 212 to form a saddle to support an elongate object, such as the bundle 102 from FIG. 1. Alternatively, the mounting surface 210 may be planar to simplify mold cavity for manufacturing purposes. The top portion 208 of the saddle section 202 includes an H-shaped frame having a bridge section 214 connecting two support rails 216, which are laterally spaced and substantially parallel to one another. In aspects, the bridge section 214 is orthogonally connected at opposing ends to a pair of substantially parallel rails, such as the support rails 216. The bridge section 214 and the support rails 216 are rigid in order to provide the mounting surface 210, which supports the bundle 102. The top portion 208 also includes two distal flexible tabs 218 that are aligned with, and disposed between, the support rails 216. The distal flexible tabs 218 are integrally connected to the bridge section 214 and laterally extend from opposing lengthwise sides of the bridge section 214. Further, the distal flexible tabs 218 are upwardly curved or planar to substantially match the curvature or flatness of the support rails 216.

In aspects, each distal flexible tab 218 may be cantilevered from the bridge section 214 and separated from each of the support rails 216 by a space 220. In addition, the saddle section 202 defines an aperture 222 for receiving a cable tie configured to wrap around and secure an object, such as the bundle 102, to the mounting surface 210 of the saddle section 202.

The saddle section 202 also includes a base portion 224, which is connected to a bottom surface of the top portion 208 of the saddle section. As further described below with respect to FIG. 7, the base portion 224 includes at least a base connecting two laterally-spaced sidewalls, which are connected to the support rails 216 of the top portion 208 of the saddle section 202. Accordingly, the base portion 224 and the top portion 208 of the saddle section 202 together define the aperture 222.

The base portion 224 may also be connected to the mounting section 206. In aspects, the mounting section 206 may extend from a bottom surface of the base portion 224 of the saddle section 202, e.g., the bottom surface of the base portion 224 is the surface of the base portion 224 that is opposite from, and faces away from, the mounting surface 210. The mounting section 206 is attachable to a supporting structure (not shown) to secure the saddle mount 104-1 to the supporting structure. By way of example only, the mounting section 206 is described herein as a stud mount. However, the mounting section 206 may include any suitable structure for mounting to the supporting structure, some examples of which include an arrowhead mount, an adhesive mount, an edge-clip mount, a screw mount, a masonry mount, a push mount, and a swivel mount. The supporting structure can include any suitable supporting structure that can receive the mounting section 206. In some implementations, the mounting section 206 may be used to secure the saddle mount 104-1 (and the bundle 102 secured thereto) to a supporting structure such as a chassis or framework of a vehicle (e.g., car, truck, airplane, boat, and so on) where the object may be subject to significant vibration and jostling. In other implementations, the mounting section 206 may be used to secure the saddle mount 104-1 to a supporting structure having little to no vibration, such as a fixed structure (e.g., beam or wall of a building).

The spring section 204 may be formed as a flexible disk or diaphragm spring 226. Any suitable size or type of diaphragm spring 226 may be implemented as the spring section 204. In aspects, the diaphragm spring 226 may extend downward from a bottom surface of the base portion 224 of the saddle section 202. The diaphragm spring 226 may include any suitable shape, such as circular, conical, or pyramidal, such that the diaphragm spring 226 provides sufficient resistance for the spring section 204.

As shown in FIG. 3, the saddle section 202 also includes a flexible friction tab 302 connected to a lengthwise side of the bridge section 214 and extending into the aperture 222. The flexible friction tab 302 is configured to engage one or more serrations on the cable tie 106, when the cable tie 106 is disposed within the aperture 222, to resist longitudinal movement of the cable tie 106 through the aperture 222. Further details of the flexible friction tab 302 engaging the serrations of the cable tie 106 are provided below with respect to FIG. 5.

The distal flexible tabs 218 have a thickness bi-directionally tapered from the bridge section 214 to the ends of two opposing distal flexible tabs. Each distal flexible tab 218 is tapered outwardly from a proximal end 304, which is connected to the bridge section 214, to a distal end 306 that is opposite the proximal end 304. Any suitable taper can be implemented in the distal flexible tabs 218. For example, the distal flexible tab 218 may be tapered by a ratio of approximately 0.5 from a first thickness 308 at the proximal end 304 to a second, thinner thickness 310 at the distal end 306. In aspects, the distal flexible tabs 218 are integrally connected to the bridge section 214 to form a flush contour on the mounting surface 210 between the bridge section 214 and the proximal end 304 of the distal flexible tab 218. As illustrated, the mounting surface 210 includes a smooth, continuously-curved surface. As mentioned above, however, the mounting surface 210 may be a planar surface. Here, the bridge section 214 and the distal flexible tab 218 are connected at a location where the distal flexible tab 218 has the first thickness 308, which is less than a thickness 312 of the bridge section 214 between top and bottom surfaces of the bridge section. In an example, the thickness 312 of the bridge section 214 may be substantially greater than (e.g., by a factor of two) the thickness 308 of the proximal end 304 of the distal flexible tab 218. Each distal flexible tab 218 has a bottom surface 314 that integrally connects to the bridge section 214 via a fillet curve 316 at the proximal end 304 of the distal flexible tab 218. The distal flexible tabs 218 are tapered to add flexibility to the distal flexible tabs 218, which allows the distal flexible tabs 218 to bend upwardly, as indicated by arrows 318, about the cantilevered connection to the bridge section 214. Further, the fillet curve 316 allows for flexibility in the distal flexible tabs 218 with a reduced risk of failure (e.g., tear, break, rip) at the connection between the distal flexible tab 218 and the bridge section 214.

Figure 5:
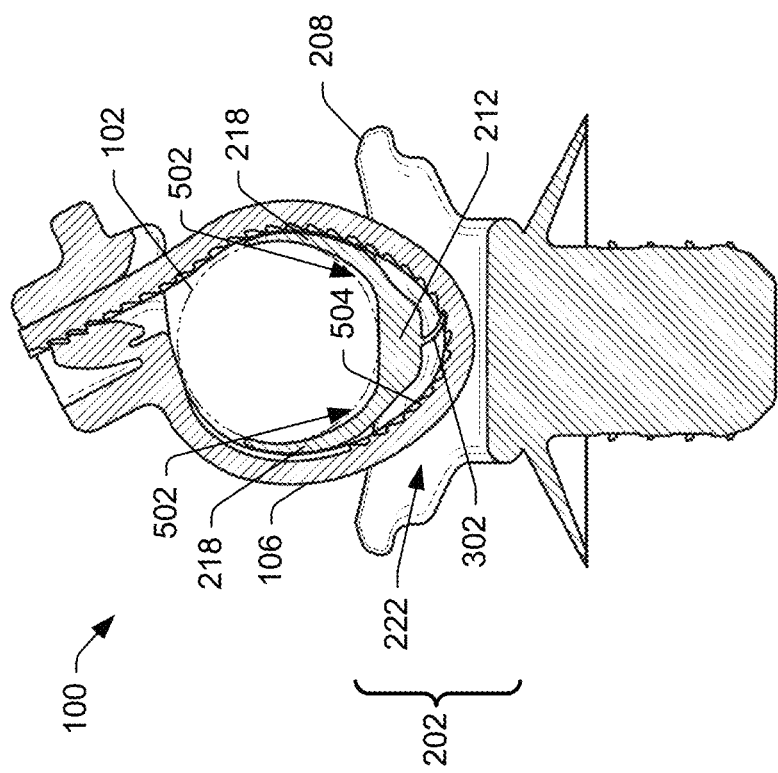
FIG. 5 illustrates a front sectional view of the cable-tie mounting assembly from FIG. 3, taken along section line 5-5.
Figure 4:
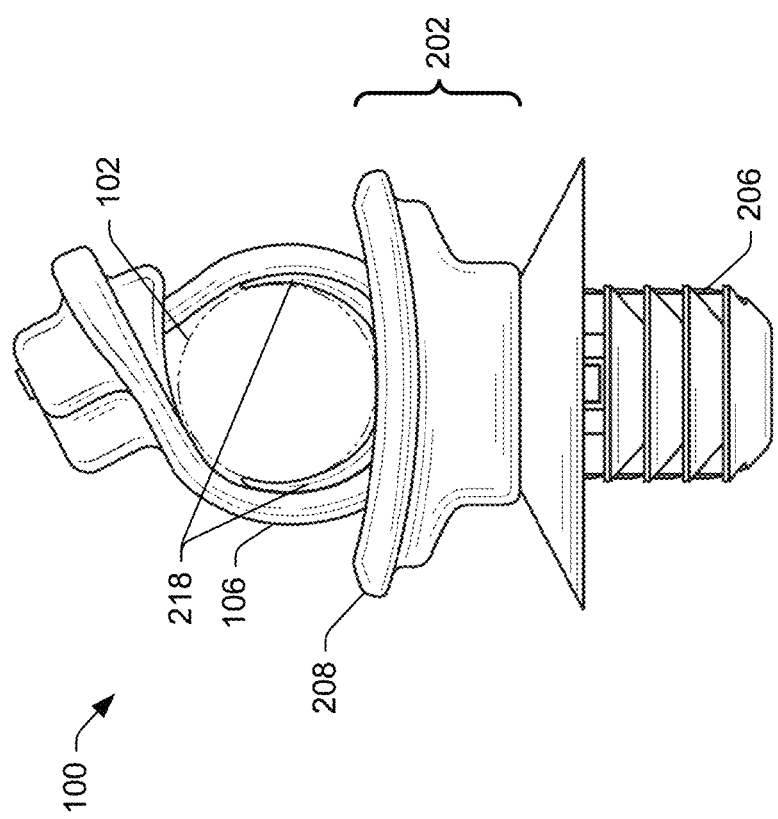
FIG. 4 illustrates a front view of the cable-tie mounting assembly from FIG. 3.

FIG. 4 illustrates a front view of the cable-tie mounting assembly 100 from FIG. 1. FIG. 5 illustrates a front sectional view of the cable-tie mounting assembly 100 from FIG. 1, taken along section line 5-5. As illustrated in FIGS. 4 and 5, the cable tie 106 is disposed through the aperture 222 and is wrapped around the bundle 102. When the cable tie 106 is tensioned, it applies a compression force on the bundle 102, the flexible friction tab 302, the distal flexible tabs 218, and the bridge section 214. The force applied to the distal flexible tabs 218 by the cable tie 106 causes the distal flexible tabs 218 to bend or deform upward toward the bundle 102 abutting the mounting surface 210, such that the distal flexible tabs 218 flex to approximately fit the contour of the bundle 102. As such, the distal flexible tabs 218 are pinched between the cable tie 106 and the bundle 102. The flexibility of the distal flexible tabs 218 significantly reduces a size of, or substantially eliminates, gaps (e.g., spaces 502) between the distal flexible tab 218 and the object when the cable tie 106 is tensioned.

As illustrated in FIG. 5, the flexible friction tab 302 engages serrations 504 on the cable tie 106 to resist longitudinal movement of the cable tie 106 through the aperture 222. The flexible friction tab 302 flexes about an axis that is parallel to the longitudinal axis 212 of the bridge section 214, such that the flexible friction tab 302 flexes toward a lengthwise direction of the cable tie 106. In addition to reducing the size of, or substantially eliminating, the gaps between the distal flexible tab 218 and the bundle 102, the distal flexible tabs 218 may also provide a level of protection to the bundle 102 from a portion of the serrations 504 when the cable tie 106 is tensioned around the bundle 102, the distal flexible tabs 218, and the bridge section 214.

Figure 6:
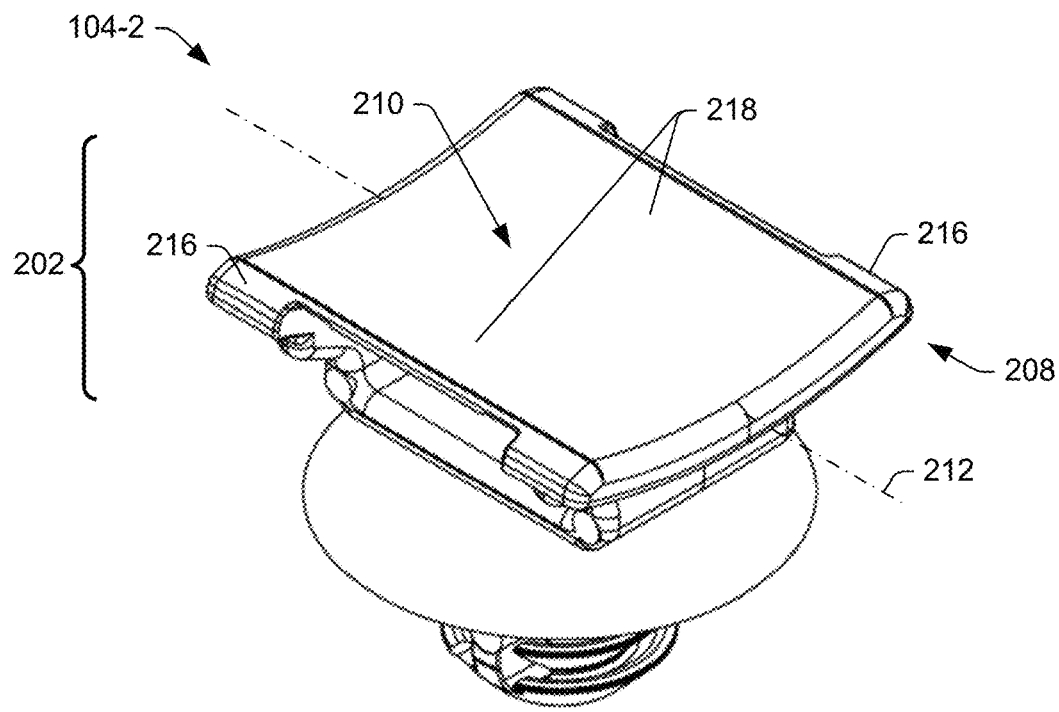
FIG. 6 illustrates an isometric view of another example implementation of a saddle mount.

FIG. 6 illustrates an isometric view of another example implementation of a saddle mount 104-2, which is another example of the saddle mount 104-1 from FIGS. 1-5. Here, the mounting surface 210 of the saddle mount 104-2 is a continuous surface without cutouts. For example, the support rails 216 are connected to the distal flexible tabs 218 such that the spaces 220 described in FIG. 2 are not included. The mounting surface 210 is upwardly curved about the longitudinal axis 212 to form a saddle to support an object, such as the bundle 102 from FIG. 1.

Figure 7:
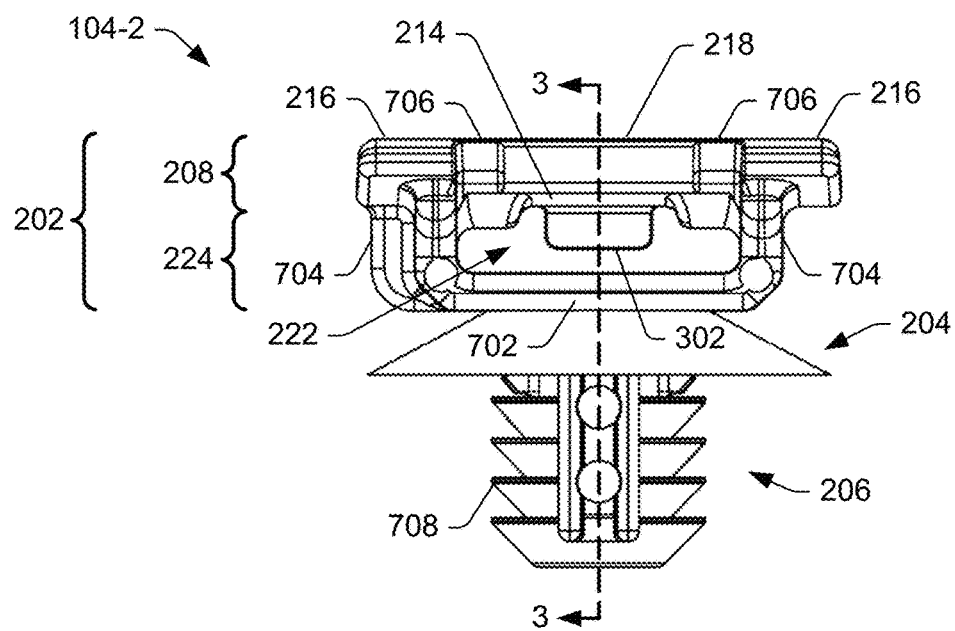
FIG. 7 illustrates a left elevational view of the saddle mount from FIG. 6.

FIG. 7 illustrates a left elevational view of the saddle mount 104-2 from FIG. 6. As above, the base portion 224 is connected to the top portion 208 to define the aperture 222. The base portion 224 includes a base 702 connecting two sidewalls 704. The sidewalls 704 are laterally spaced apart and substantially parallel to one another. The sidewalls 704 are positioned on opposing sides of the base 702 and, thus, opposing sides of the aperture 222. The base 702 of the base portion 224 is connected to the mounting section 206 and, in some implementations, the spring section 204. The base portion 224 described with respect to FIG. 7 may be the same base portion that is described with respect to FIGS. 2-5.

The flexible friction tab 302 is connected to a lengthwise side of the bridge section 214 and extends downwardly into the aperture 222 from the bridge section 214. The mounting section 206 may include a plurality of extensions or branches 708 extending laterally from the mounting section 206. The branches 708 are longitudinally spaced apart from one another and are tapered upwardly towards the base portion 224 of the saddle section 202. The branches 708 provide resistance to removal of the mounting section 206 from a hole in a supporting structure. In some aspects, the branches 708 may be threads usable for insertion into a predrilled hole.

In this example implementation, the top portion 208 includes a connecting member 706 that connects the support rails 216 to the distal flexible tabs 218. Each distal flexible tab 218 is connected to each support rail 216 by the connecting member 706. The connecting member 706 has a thickness that is less than the thickness of the distal flexible tab 218 to which it is connected, such as by a ratio of approximately 0.5. The thinness of the connecting member 706 is sufficient to enable deformation or stretching of the connecting member 706. As is described in more detail below with respect to FIGS. 11 and 12, the connecting member 706 is plastically deformable to enable the distal flexible tab 218 to bend to the diameter of the bundle 102. The connecting member 706 may have a different flexural modulus than that of the distal flexible tabs 218 and/or the support rails 216. The flexural modulus is a property representing flexibility and is computed as a ratio of stress to strain in flexural deformation, or the tendency for a material to resist bending. The flexural modulus may be different at least partially due to different geometry of the connecting member 706 compared to that of the support rails 216 and the distal flexible tabs 218 (e.g., the connecting member 706 is thinner than the distal flexible tabs 218 and the support rails 216). The connecting member 706 may be formed of the same material as that of the distal flexible tabs 218 and/or the support rails 216 and have a different flexural modulus due to the different geometry. In some aspects, the material forming the connecting member 706 may be a different material than a material used for the distal flexible tabs 218 and/or the support rails 216, which may result in the connecting member 706 having a different flexural modulus than that of the distal flexible tabs 218 and/or the support rails 216.

In addition, a cross section of the saddle mount 104-2 having the continuous surface for the mounting surface 210 (as shown in FIG. 6), taken along section line 3-3 in FIG. 7, is represented by the sectional view illustrated in FIG. 3 such that the sectional view in FIG. 3 applies to each implementation of the saddle mount (e.g., the saddle mount 104-1 and the saddle mount 104-2) described herein.

Figure 8:
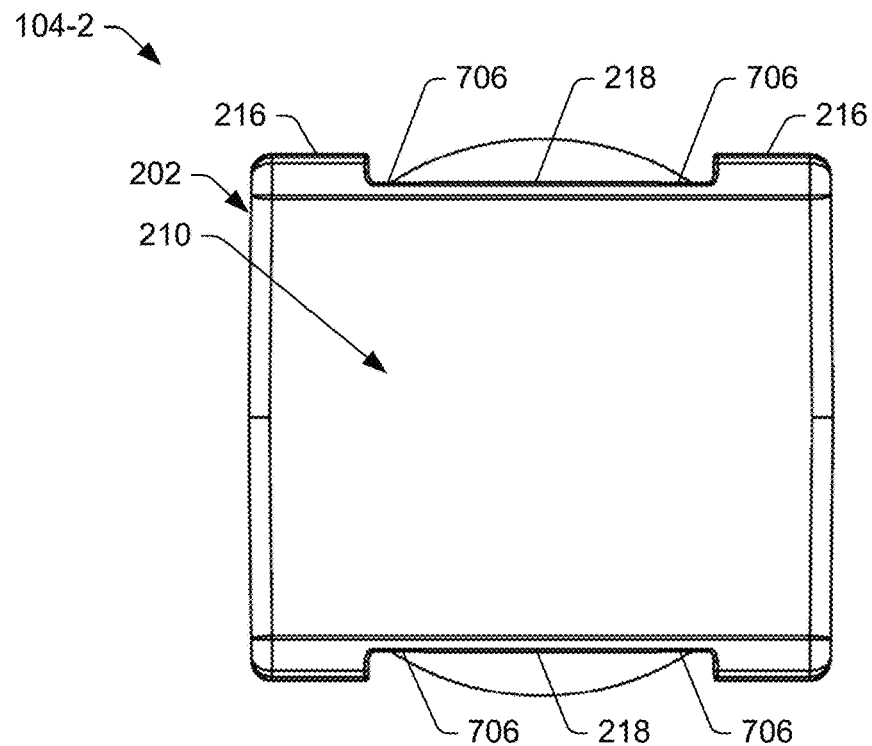
FIG. 8 illustrates a top plan view of the saddle mount from FIG. 6.

FIG. 8 illustrates a top plan view of the saddle mount 104-2 from FIG. 6. As illustrated, the mounting surface 210 of the saddle mount 104-2 is a smooth, continuous surface. The distal flexible tabs 218 are connected to each support rail 216 by the connecting member 706 to provide the continuous surface of the mounting surface 210. The connecting member 706 is symmetrically located in four locations to focus and enable stretching.

Figure 9:
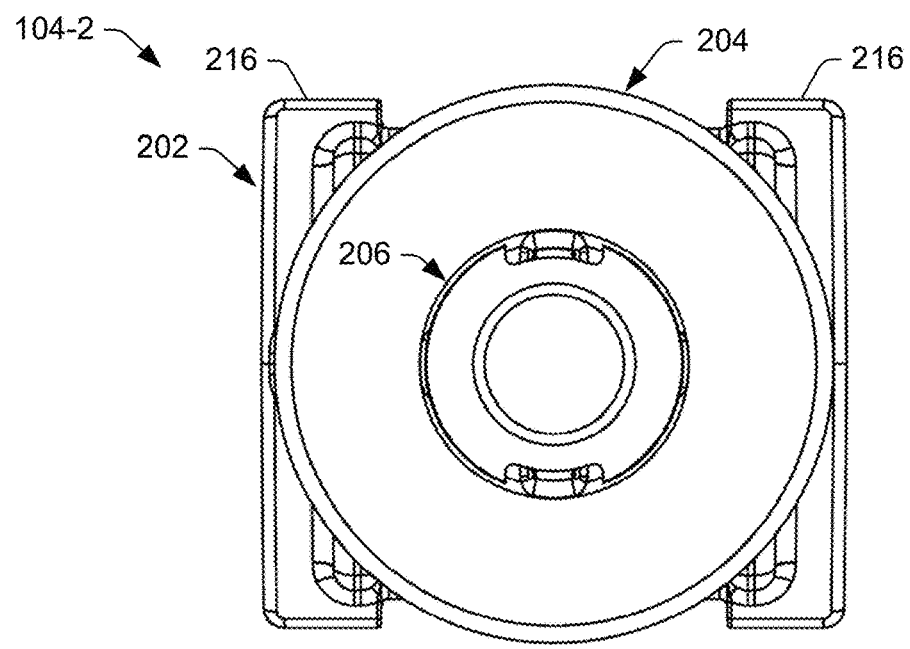
FIG. 9 illustrates a bottom plan view of the saddle mount from FIG. 6.

FIG. 9 illustrates a bottom plan view of the saddle mount 104-2 from FIG. 6. Here, a bottom surface of the mounting section 206 is shown, and also a bottom surface of the spring section 204. In addition, a bottom surface of the support rails 216 of the saddle section 202 are shown. The mounting section 206 is illustrated as being substantially concentric with the spring section 204.

Figure 10:
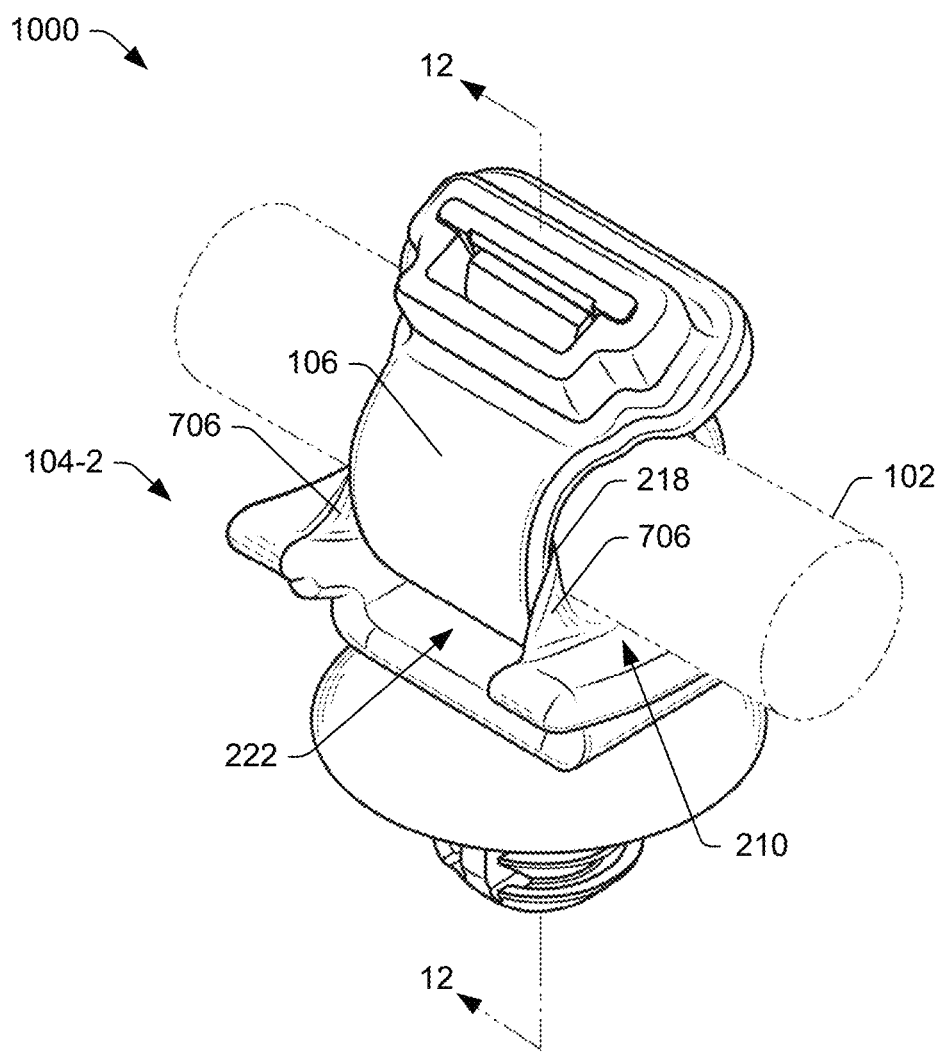
FIG. 10 illustrates an isometric view of an example implementation of a cable-tie mounting assembly securing a bundle, using the saddle mount from FIG. 6.

FIG. 10 illustrates an isometric view of an example implementation of a cable-tie mounting assembly 1000 securing the bundle 102, using the saddle mount 104-2 from FIG. 6. Here, the cable tie 106 is assembled to the saddle mount 104-2 (e.g., a portion of the cable tie 106 is disposed within the aperture 222). The cable tie 106 is wrapped and tensioned around the bundle 102, which abuts the mounting surface 210 of the saddle mount 104-2. Due to the compression force applied during installation by tensioning the cable tie 106, the distal flexible tabs 218 are upwardly bent to substantially fit the contour of the bundle 102. As illustrated, the connecting member 706 plastically deforms (e.g., stretches), based on the force applied by the cable tie 106 to the distal flexible tabs 218, to enable the distal flexible tabs 218 to flex toward the bundle 102.

Figure 12:
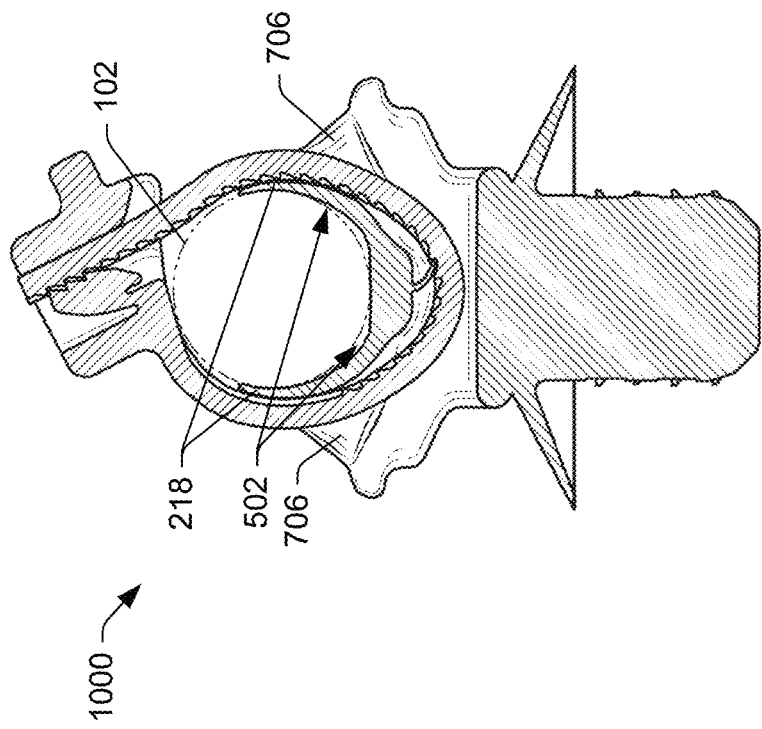
FIG. 12 illustrates a sectional view of the saddle mount from FIG. 10, taken along section line 12-12.
Figure 11:
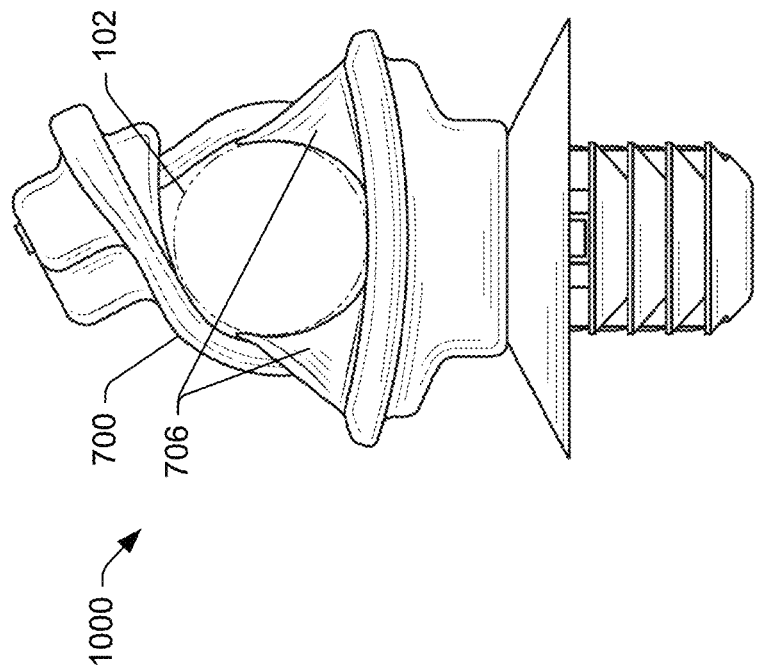
FIG. 11 illustrates a front view of the cable-tie mounting assembly from FIG. 10.

FIG. 11 illustrates a front view of the cable-tie mounting assembly from FIG. 10. FIG. 12 illustrates a sectional view of the cable-tie mounting assembly from FIG. 10, taken along section line 12-12. FIGS. 11 and 12 further illustrate plastic deformation of the connecting member 706 after the cable tie 106 has applied an upward force to the distal flexible tabs 218, based on the cable tie 106 being tensioned, to tightly secure the bundle 102 to the mounting surface 210 of the saddle mount 104-2. Also, gaps (e.g., spaces 502) between the bundle 102 and the distal flexible tabs 218 are significantly reduced in size or substantially eliminated due to the flexion or deformation of the distal flexible tabs 218.

The following are additional examples of techniques for a saddle mount.

Example 1: A saddle mount that adjusts to a bundle diameter, the saddle mount comprising: a mounting section that is attachable to a supporting structure to secure the saddle mount to the supporting structure; and a saddle section: defining a mounting surface and an aperture for receiving a cable tie configured to wrap around and secure a bundle to the mounting surface; having a base portion connected to the mounting section, the mounting section extending from a surface of the base portion of the saddle section that is opposite the mounting surface; and having a mounting portion comprising: a bridge section connecting two laterally spaced and substantially parallel support rails, the support rails to support the mounting surface of the saddle section for abutting the bundle; and first and second distal flexible tabs: laterally-extending from opposing lengthwise sides of the bridge section; being upwardly curved to match the upward curve of the support rails; having a thickness tapered from a proximal end connected to the bridge section to a distal end; and configured to flex to conform to the diameter of the bundle based on an upward force applied by the cable tie when the cable tie is disposed within the aperture and tensioned around the bundle abutting the mounting surface.

Example 2. The saddle mount as recited in example 1, wherein the first and second distal flexible tabs are cantilevered to the bridge section and separated from each support rail by a space.

Example 3. The saddle mount as recited in example 2, wherein each distal flexible tab of the first and second distal flexible tabs is integrally connected to the bridge section to form: a flush contour on the mounting surface of the saddle section between the bridge section and the proximal end of the distal flexible tab; and a fillet curve between the bridge section and the proximal end of the distal flexible tab on a surface of the distal flexible tab that is opposite the mounting surface.

Example 4. The saddle mount as recited in example 1, wherein the first and second distal flexible tabs are connected to the support rails via a connecting member to form a continuous surface for the mounting surface of the saddle section.

Example 5. The saddle mount as recited in example 4, wherein the connecting member is plastically deformable.

Example 6. The saddle mount as recited in example 4, wherein the connecting member is thinner than the distal end of each of the first and second distal flexible tabs.

Example 7. The saddle mount as recited in example 4, wherein the connecting member has a different flexural modulus than the first and second distal flexible tabs.

Example 8. The saddle mount as recited in example 1, wherein: the saddle section comprises a friction tab that is disposed within the aperture and extends from the bridge section; and the friction tab is configured to engage one or more serrations on the cable tie, when the cable tie is disposed within the aperture, to resist longitudinal movement of the cable tie.

Example 9. The saddle mount as recited in example 6, wherein: the friction tab is connected to a lengthwise side of the bridge section within the aperture; and the friction tab is flexible about an axis that is parallel to a longitudinal axis of the bridge section.

Example 10. The saddle mount as recited in example 1, wherein each distal flexible tab is configured to flex to reduce a size of one or more gaps created between the bundle, the cable tie, and the distal flexible tab when the cable tie is disposed within the aperture and tensioned around the bundle abutting the mounting surface.

Example 11. The saddle mount as recited in example 1, wherein: the bridge section has a thickness between the mounting surface and a surface of the bridge section that is opposite the mounting surface; and the thickness of the bridge section being greater than the thickness of the proximal end of the first and second distal flexible tabs.

Example 12. The saddle mount as recited in example 11, wherein each distal flexible tab of the first and second distal flexible tabs is integrally connected to the bridge section to form: a flush contour on the mounting surface of the saddle section between the bridge section and the proximal end of the distal flexible tab; and a fillet curve between the bridge section and the proximal end of the distal flexible tab on a surface of the distal flexible tab that is opposite the mounting surface.

Example 13. A saddle mount that adjusts to a bundle diameter, the saddle mount comprising: a first portion having: a mounting surface for supporting a bundle; an H-shaped frame comprising a bridge section orthogonally connected at opposing ends to a pair of rails, which are substantially parallel to one another; and two distal flexible tabs aligned with, and disposed between, the pair of rails, each distal flexible tab integrally connected to a lengthwise side of the bridge section to form a flush contour of the mounting surface at a location where the distal flexible tab has a first thickness that is less than a second thickness of the bridge section, each distal flexible tab tapered from a proximal end connected to the bridge section to a distal end, each distal flexible tab configured to flex based on an upward force to conform to the diameter of the bundle abutting the mounting surface; and a second portion connected to the first portion opposite the mounting surface to define an aperture for receiving a cable tie configured to wrap around and secure the bundle to the mounting surface, the second portion being connectable to a mounting section that is attachable to a supporting structure to secure the saddle mount to the supporting structure.

Example 14. The saddle mount as recited in example 13, wherein each distal flexible tab is cantilevered to the bridge section and separated from each rail of the pair of rails by a space.

Example 15. The saddle mount as recited in example 14, wherein each distal flexible tab is integrally connected to the bridge section to form: a flush contour on the mounting surface of the first portion between the bridge section and the proximal end of the distal flexible tab; and a fillet curve on another surface of the distal flexible tab that is opposite the mounting surface, the fillet curve disposed between the bridge section and the proximal end of the distal flexible tab.

Example 16. The saddle mount as recited in example 13, wherein each distal flexible tab is connected to the pair of rails via a connecting member to form a continuous surface for the mounting surface of the saddle mount.

Example 17. The saddle mount as recited in example 16, wherein the connecting member is plastically deformable.

Example 18. The saddle mount as recited in example 16, wherein the connecting member has a different flexural modulus than the distal flexible tabs.

Example 19. The saddle mount as recited in example 16, wherein each distal flexible tab is integrally connected to the bridge section to form: a flush contour on the mounting surface of the first portion between the bridge section and the proximal end of the distal flexible tab; and a fillet curve on another surface of the distal flexible tab that is opposite the mounting surface, the fillet curve disposed between the bridge section and the proximal end of the distal flexible tab.

Example 20. The saddle mount as recited in example 13, further comprising a flexible friction tab: connected to a lengthwise side of the bridge section and extending into the aperture; and configured to engage one or more serrations on the cable tie, when the cable tie is disposed within the aperture, to resist longitudinal movement of the cable tie.

CONCLUSION

Although aspects of a saddle mount for a cable-tie mounting assembly have been described in language specific to features and/or methods, the subject of the appended claims is not necessarily limited to the specific features or methods described. Rather, the specific features and methods are disclosed as example implementations of the saddle mount, and other equivalent features and methods are intended to be within the scope of the appended claims. Further, various different aspects are described, and it is to be appreciated that each described aspect can be implemented independently or in connection with one or more other described aspects.

What is claimed:

1. A saddle mount that adjusts to a bundle diameter, the saddle mount comprising:
    a mounting section that is attachable to a supporting structure to secure the saddle mount to the supporting structure; and
    a saddle section:
        defining a mounting surface and an aperture for receiving a cable tie configured to wrap around and secure a bundle to the mounting surface;
        having a base portion connected to the mounting section, the mounting section extending from a surface of the base portion of the saddle section that is opposite the mounting surface; and
        having a mounting portion comprising:
            a bridge section connecting two laterally spaced and substantially parallel support rails to support the mounting surface of the saddle section for abutting the bundle; and
            first and second distal flexible tabs:
                laterally-extending from opposing lengthwise sides of the bridge section;
                being aligned with the support rails;
                having a thickness tapered from a proximal end connected to the bridge section to a distal end; and configured to flex to conform to the diameter of the bundle based on an upward force applied by the cable tie when the cable tie is disposed within the aperture and tensioned around the bundle abutting the mounting surface.

2. The saddle mount as recited in claim 1, wherein the first and second distal flexible tabs are cantilevered to the bridge section and separated from each support rail by a space.

3. The saddle mount as recited in claim 2, wherein each distal flexible tab of the first and second distal flexible tabs is integrally connected to the bridge section to form:
   a flush contour on the mounting surface of the saddle section between the bridge section and the proximal end of the distal flexible tab; and
   a fillet curve between the bridge section and the proximal end of the distal flexible tab on a surface of the distal flexible tab that is opposite the mounting surface.

4. The saddle mount as recited in claim 1, wherein the first and second distal flexible tabs are connected to the support rails via a connecting member to form a continuous surface for the mounting surface of the saddle section.

5. The saddle mount as recited in claim 4, wherein the connecting member is plastically deformable.

6. The saddle mount as recited in claim 4, wherein the connecting member is thinner than the distal end of each of the first and second distal flexible tabs.

7. The saddle mount as recited in claim 4, wherein the connecting member has a different flexural modulus than the first and second distal flexible tabs.

8. The saddle mount as recited in claim 1, wherein:
   the saddle section comprises a flexible friction tab that is disposed within the aperture and extends from the bridge section; and
   the flexible friction tab is configured to engage one or more serrations on the cable tie, when the cable tie is disposed within the aperture, to resist longitudinal movement of the cable tie.

9. The saddle mount as recited in claim 8, wherein:
   the flexible friction tab is connected to a lengthwise side of the bridge section within the aperture; and
   the flexible friction tab is flexible about an axis that is parallel to a longitudinal axis of the bridge section.

10. The saddle mount as recited in claim 1, wherein each distal flexible tab is configured to flex to reduce a size of one or more gaps created between the bundle, the cable tie, and the distal flexible tab when the cable tie is disposed within the aperture and tensioned around the bundle abutting the mounting surface.

11. The saddle mount as recited in claim 1, wherein:
   the bridge section has a thickness between the mounting surface and a surface of the bridge section that is opposite the mounting surface; and
   the thickness of the bridge section being greater than the thickness of the proximal end of the first and second distal flexible tabs.

12. The saddle mount as recited in claim 11, wherein each distal flexible tab of the first and second distal flexible tabs is integrally connected to the bridge section to form:
   a flush contour on the mounting surface of the saddle section between the bridge section and the proximal end of the distal flexible tab; and
   a fillet curve between the bridge section and the proximal end of the distal flexible tab on a surface of the distal flexible tab that is opposite the mounting surface.

13. A saddle mount that adjusts to a bundle diameter, the saddle mount comprising:
   a first portion having:
      a mounting surface for supporting a bundle;
      an H-shaped frame comprising a bridge section orthogonally connected at opposing ends to a pair of rails, which are substantially parallel to one another; and
      two distal flexible tabs aligned with, and disposed between, the pair of rails, each distal flexible tab integrally connected to a lengthwise side of the bridge section to form a flush contour of the mounting surface at a location where the distal flexible tab has a first thickness that is less than a second thickness of the bridge section, each distal flexible tab tapered from a proximal end connected to the bridge section to a distal end, each distal flexible tab configured to flex based on an upward force to conform to the diameter of the bundle abutting the mounting surface; and
   a second portion connected to the first portion opposite the mounting surface to define an aperture for receiving a cable tie configured to wrap around and secure the bundle to the mounting surface, the second portion being connectable to a mounting section that is attachable to a supporting structure to secure the saddle mount to the supporting structure.

14. The saddle mount as recited in claim 13, wherein each distal flexible tab is cantilevered to the bridge section and separated from each rail of the pair of rails by a space.

15. The saddle mount as recited in claim 14, wherein each distal flexible tab is integrally connected to the bridge section to form:
   a flush contour on the mounting surface of the first portion between the bridge section and the proximal end of the distal flexible tab; and
   a fillet curve on another surface of the distal flexible tab that is opposite the mounting surface, the fillet curve disposed between the bridge section and the proximal end of the distal flexible tab.

16. The saddle mount as recited in claim 13, wherein each distal flexible tab is connected to the pair of rails via a connecting member to form a continuous surface for the mounting surface of the saddle mount.

17. The saddle mount as recited in claim 16, wherein the connecting member is plastically deformable.

18. The saddle mount as recited in claim 16, wherein the connecting member has a different flexural modulus than the two distal flexible tabs.

19. The saddle mount as recited in claim 16, wherein each distal flexible tab is integrally connected to the bridge section to form:
   a flush contour on the mounting surface of the first portion between the bridge section and the proximal end of the distal flexible tab; and
   a fillet curve on another surface of the distal flexible tab that is opposite the mounting surface, the fillet curve disposed between the bridge section and the proximal end of the distal flexible tab.

20. The saddle mount as recited in claim 13, further comprising a flexible friction tab:
   connected to a lengthwise side of the bridge section and extending into the aperture; and
   configured to engage one or more serrations on the cable tie, when the cable tie is disposed within the aperture, to resist longitudinal movement of the cable tie.

* * * * *